April 30, 1968

G. P. McGRAW, JR 3,380,275

SPIN FORMING DEVICE

Filed Dec. 13, 1965

INVENTOR
G.P. McGRAW JR.
BY A.C. Schwarz jr.
ATTORNEY

United States Patent Office 3,380,275
Patented Apr. 30, 1968

3,380,275
SPIN FORMING DEVICE
George P. McGraw, Jr., Downers Grove, Ill., assignor to Western Electric Company, Incorporated, New York, N.Y., a corporation of New York
Filed Dec. 13, 1965, Ser. No. 513,493
4 Claims. (Cl. 72—121)

ABSTRACT OF THE DISCLOSURE

An apparatus for forming a solid electrode at each end of a wound foil capacitor by axially spin swaging each end of the capacitor and simultaneously spin swaging a chamfer onto the circumferential edge of each end of the capacitor by applying a predetermined force with a sloping, movable swaging tool.

This invention relates to a spin forming device and, more particularly, to a tool for spin swaging the ends of extended foil capacitors of various diameters to form terminals thereon.

In the field of manufacturing wound capacitors of the type having tin foil electrodes with portions of the foil electrodes extending respectively from opposite ends of the capacitor, apparatus is provided having rotary spin forming tools which have fixed forming surfaces and are movable into engagement with the extended foil portions of the capacitor to form compressed terminals thereof. Inasmuch as spin tools having fixed forming surfaces are practically limited to the forming of the ends of capacitors having the same diameter, difficulty has been experienced in the proper forming of the terminals on the capacitors where the diameter of the capacitors vary as for example due to variations in thickness of the dielectric webs of the capacitor.

It is an object of the present invention to provide a tool capable of spin forming the end portions of cylindrical articles of various diameters.

A tool illustrating certain features of the invention may include a head mounted for rotation about an axis and for axial movement toward and from the end of an extended foil capacitor supported coaxially therewith. A forming element centrally mounted on the rotary head has a flat surface disposed normal to the axis of the tool and engageable with the end of the capacitor for spin forming and compressing the foil in response to axial movement of the tool against the capacitor. Pivotally mounted on the head are a pair of forming members which have oblique forming surfaces and are actuated under the influence of centrifugal force during rotation of the tool to press the oblique forming surfaces radially against the capacitor to aid in compressing and shaping the extended foil at the end of the capacitor into a flat terminal.

Other objects, advantages and novel aspects of the invention will become apparent upon consideration of the following detailed description, in conjunction with the accompanying drawing, in which.

Figure 1:
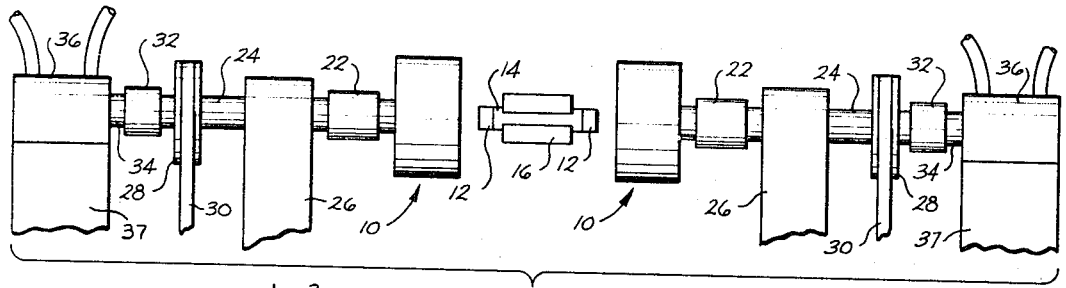
FIG. 1 is a fragmentary diagrammatic view of an apparatus embodying the present invention for spin forming the end portions of extended foil capacitors.

Referring to FIG. 1 of the drawings, a pair of spin forming tools 10, 10 are indicated as a part of a device for spin forming the extended foil ends 12, 12 of a wound capacitor 14 into compact terminals in accordance with the method disclosed in U.S. Patent No. 3,237,274 granted to R. F. Kalina on Mar. 1, 1966. The capacitor is releasably supported in a holder 16 between the tools. Each of the tools 10 includes a cylindrical head 18 with a stub shaft 20 extending axially therefrom. A coupling 22 interconnects the stub shaft 20 with a drive shaft 24 that is mounted in an aperture of a stationary supporting member 26 for rotation and for axial movement toward and from the capacitor 14. Rotation is imparted to the shaft 24 and the tool 10 through a pulley 28 and a belt 30 from a suitable drive mechanism (not shown). A swivel coupling 32 interconnects the drive shaft 24 with a piston rod 34 of a fluid-operated actuator 36 which is mounted on a stationary support 37 and is selectively actuated to effect the axial movement of the tool toward and from the capacitor 14.

It will be understood that the capacitor 14 is of the wound type having a pair of tin foils which are supported between dielectric webs of overlapping, insulated, and partially offset relation to each other and with portions of the foils respectively extending from the dielectric webs at opposite ends of the capacitors.

Figure 2:
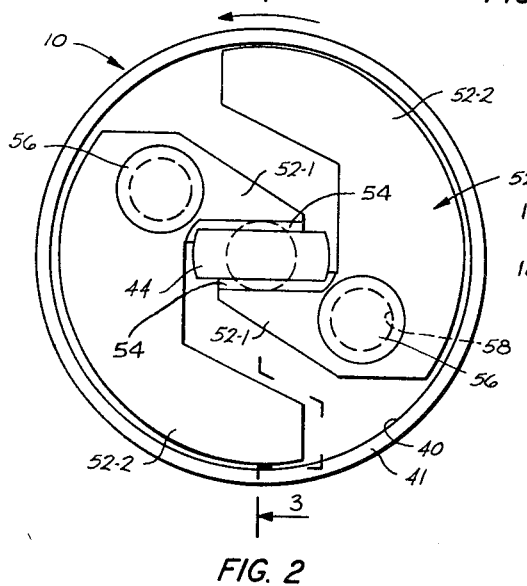
FIG. 2 is an end view of one of the spin forming tools showing a pair of movable forming members thereof in closed position.
Figure 3:
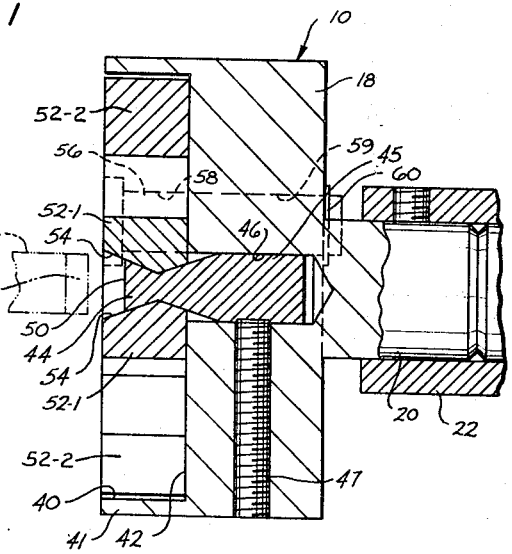
FIG. 3 is a fragmentary vertical, longitudinal, cross-sectional view through the spin forming tool taken on the line 3—3 of FIG. 2.
Figure 4:
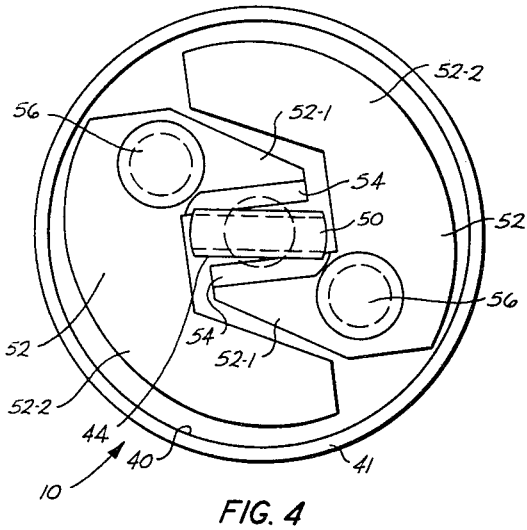
FIG. 4 is an end view of the tool showing the movable forming members moved to an open position.

As shown in FIGS. 2 and 3, the head 18 of the spin forming tool 10 is provided with a cylindrical recess 40 which is defined by an annular flange 41 and a flat surface 42 disposed perpendicular to the axis of the tool. Disposed centrally of the tool in the recess 40 is a forming element 44 having a shank 45 which is positioned in a recess 46 in the head 18 and is secured to the head by a set screw 47. The forming element 44 which is substantially rectangular in outline and of less width and greater length than the diameter of the capacitors 14 has a flat forming surface 50 disposed perpendicular to the axis of the tool. The surface 50 is engageable with the extended foil at one end of the capacitor and to compress and spin form the foil in response to movement of the tool axially into engagement with the capacitor.

To prevent the mushrooming of the foil radially during the spin forming operation, two forming members 52 are provided having obliquely disposed forming surfaces 54 engageable with opposite sides of the capacitor. The members 52 are in the form of irregularly shaped bell cranks and are pivotally supported on headed pins 56 in diametrically opposed relation to each other. The headed pins 56 pass through counterbored apertures 58 in the forming members 52 and through apertures 59 in the body of the tool and are locked in position by retaining rings 60 (FIG. 3).

Figure 5:
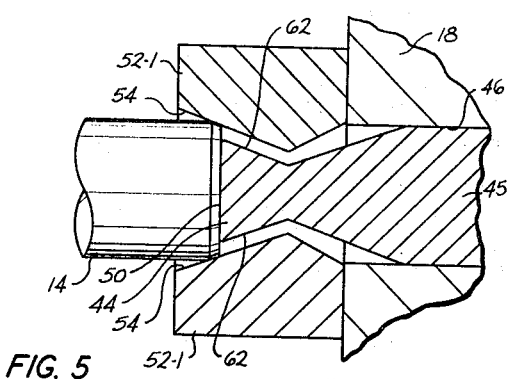
FIG. 5 is a fragmentary, longitudinal sectional view of the tool and showing the end portion of a capacitor in engagement with and being formed by the forming components of the tool.

The oblique surfaces 54 are formed on arms 52-1 of the members 52 and are disposed in diverging relation to each other, as indicated in FIG. 5. The arms 52-1 extend from the pivot pins 56 on opposite sides of the forming element 44 and are relatively small with respect to the arms 52-2 of the members 52. The arms 52-2 extend from the pivot pins 56 in proximity to the flange 41 and have cylindrical outer surfaces conforming to the latter. With the tool 10 rotating, and under the influence of centrifugal force acting on the arms 52-2, the members 52 are stressed for pivotal movement in a clockwise direction about the pins 56, as viewed in FIG. 2, and effect the movement of the arms 52-1 and the forming surfaces 54 thereof toward the axis of the tool to a normal operating position in which they are stopped by engagement with the forming element 44, as shown in FIGS. 2 and 3. In the operating position of the forming members 52, substantial portions of the oblique forming surfaces 54 extend divergingly beyond the member 44 through an extent sufficient to engage and act on capacitors of various diameters within predetermined limits. The forming element 44 has V-shaped clearance grooves 62 on opposite sides thereof for receiving portions of the arms 52-1.

In the operation of the apparatus, a capacitor 14 is supported in and moved by the holder 16 to an operative position between the spin forming tools 10 as indicated in FIG. 1, after which the actuators 36, 36 are operated to effect the axial movement of the tools 10, 10 toward the capacitor 14. During the operating periods of the apparatus, the spin tools 10 are rotated continuously in opposite directions. As the tools 10 approach the ends of the capacitor, the diverging forming surfaces 54 of the members 52 engage the peripheral surfaces of the extended foil ends of the capacitor, and as the tools 10 are advanced further, the foils ends are compressed radially inwardly slightly by the wiping action of the forming surfaces 54. Further axial movement of the tools 10 (FIG. 1) brings the forming surfaces 50 of the rotating forming elements 44 into engagement with the foil ends of the capacitor and serve to spin swage the foils axially into solid terminals.

The foils during the axial compression thereof tend to spread radially outwardly but are maintained within the peripheral confines of the capacitor by the forming surfaces 54 of the rotating members 52, which members also form a beveled annular edge surface on the compressed disc-like foil terminals and adjust automatically to variations in the diameters of the capacitors 14 being processed.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device of the type described:
    a head mounted for rotation about an axis;
    means on said head defining a forming surface disposed perpendicular to the axis for engaging and spin forming the end portions of a cylindrical article in response to relative axial movement between said head and the article; and
    at least one forming member mounted on said head for rotation therewith and for movement relative thereto, said forming member being urged for movement toward the axis to an operative position and yieldably retained thereat during rotation of said head and having a forming surface disposed obliquely to the axis for engaging and shaping a peripheral portion of the article in response to relative axial movement between said head and the article.

2. A tool for spin forming the end of a cylindrical article which comprises:
    a head mounted for rotation about an axis;
    means on said head defining a first forming surface perpendicular to the axis for engaging and spin forming the end of the cylindrical article in response to relative axial movement between said head and the article; and
    means mounted on said head for rotation therewith and for movement relative thereto and defining a pair of second forming surfaces movable toward the axis to an operative position and yieldably retained therein during rotation of said head and with portions of said second forming surfaces extending from opposite sides of said first forming surface in divergent relation to each other and in position for engaging and shaping the peripheral surfaces at the end of the article in response to relative axial movement between said head and the article.

3. A device of the type described which comprises:
    a head mounted for rotation about an axis;
    a forming element centrally mounted on said head and having a flat forming surface disposed perpendicular to the axis for engaging and spin forming one end of a cylindrical article in response to relative axial movement between said head and the article, said forming element and said flat surface thereon being of substantially rectangular outline and having a width less than and a length greater than the diameter of the article being formed; and
    a pair of forming members pivotally mounted on said head for rotation therewith, said forming members having portions disposed respectively on opposite sides of said forming element and urged for movement toward the axis to an operative position in engagement with opposite sides of said forming element and yieldably retained thereat during rotation of said head and having oblique forming surfaces extending in diverging relation to each other from said flat forming surface in position to engage and to shape the peripheral portions of the end of the article in response to relative axial movement between said head and said article.

4. A device of the type described which comprises:
    a head mounted for rotation about an axis;
    drive means for rotating said head;
    a holder for supporting a cylindrical article adjacent to and in coaxial alignment with said head;
    means on said head defining a centrally located flat forming surface disposed perpendicular to the axis for engaging the end surface of the article and spin forming the end of the article in response to relative axial movement between said head and the article;
    a pair of forming members mounted on said head for rotation therewith and for movement relative thereto, said members having portions disposed, respectively, on opposite sides of the axis and provided with obliquely disposed forming surfaces, respectively, and urged for movement toward the axis during the rotation of said head; and
    means on said head for stopping said members in a predetermined position with said oblique forming surfaces extending in diverging relation to each other from said flat forming surface in position to engage and to shape the peripheral portions of the end of the article in response to relative axial movement between said head and the article.

References Cited

UNITED STATES PATENTS

| | | | |
|---|---|---|---|
| 2,194,385 | 3/1940 | Cove | 72—120 |
| 2,848,804 | 8/1958 | Graves | 72—112 |
| 3,225,998 | 12/1965 | Bowman | 72—121 |
| 3,237,274 | 3/1966 | Kalina | 29—25.42 |

RICHARD J. HERBST, *Primary Examiner.*

K. C. DECKER, *Assistant Examiner.*